United States Patent
Naim et al.

(10) Patent No.: US 12,432,428 B2
(45) Date of Patent: Sep. 30, 2025

(54) METHOD AND SYSTEM FOR PRODUCING INTERACTION-AWARE VIDEO SYNOPSIS

(71) Applicant: BRIEFCAM LTD., Modi'in (IL)

(72) Inventors: Ariel Naim, Modi'in (IL); Igal Dvir, Modi'in (IL); Shmuel Peleg, Modi'in (IL)

(73) Assignee: BRIEFCAM LTD., Modi'in (IL)

( * ) Notice: Subject to any disclaimer, the term of this patent is extended or adjusted under 35 U.S.C. 154(b) by 0 days.

(21) Appl. No.: 18/644,707

(22) Filed: Apr. 24, 2024

(65) Prior Publication Data

US 2024/0357218 A1    Oct. 24, 2024

Related U.S. Application Data

(60) Provisional application No. 63/497,773, filed on Apr. 24, 2023.

(51) Int. Cl.
*H04N 21/8549* (2011.01)
*G06T 7/194* (2017.01)

(52) U.S. Cl.
CPC ......... *H04N 21/8549* (2013.01); *G06T 7/194* (2017.01); *G06T 2207/20081* (2013.01)

(58) Field of Classification Search
CPC ............... H04N 21/8549; G06T 7/194; G06T 2207/20081
USPC ...................................................... 386/241
See application file for complete search history.

(56) References Cited

U.S. PATENT DOCUMENTS

| | | | | |
|---|---|---|---|---|
| 5,768,447 A * | 6/1998 | Irani | ...... | G11B 27/28 715/721 |
| 8,102,406 B2 * | 1/2012 | Peleg | ...... | G06T 3/16 345/474 |
| 8,311,277 B2 * | 11/2012 | Peleg | ...... | G06F 16/7837 382/103 |
| 8,514,248 B2 * | 8/2013 | Peleg | ...... | G11B 27/034 345/475 |
| 8,818,038 B2 * | 8/2014 | Peleg | ...... | G06F 16/739 382/103 |

(Continued)

OTHER PUBLICATIONS

A. Rav-Acha, Y. Pritch, and S. Peleg. Making a Long Video Short. In CVPR, Jun. 2006.

(Continued)

*Primary Examiner* — Helen Shibru
(74) *Attorney, Agent, or Firm* — PEARL COHEN ZEDEK LATZER BARATZ LLP

(57) ABSTRACT

A method and system for generating an interaction-aware video synopsis are provided herein. The method may include the following steps: obtaining, a source video containing a plurality of source objects; extracting the source objects from the source video; detecting at least one object-interaction between at least two source objects; generating synopsis objects by sampling respective source objects; and generating a synopsis video having an overall play time shorter than the overall play time of the source video, by determining a play time for each one of the synopsis objects, wherein a relative display time in the synopsis video of the at least two synopsis objects created from the at least two source objects, detected as having an object-interaction therebetween, is the same as the relative display time of the at least two source objects in the source video.

21 Claims, 2 Drawing Sheets

(56) References Cited

U.S. PATENT DOCUMENTS

| | | | | |
|---|---|---|---|---|
| 8,949,235 | B2* | 2/2015 | Peleg | G06F 16/739 707/711 |
| 9,877,086 | B2* | 1/2018 | Richardson | G11B 27/10 |
| 10,958,854 | B2* | 3/2021 | Elboher | G06V 20/54 |
| 11,328,160 | B2* | 5/2022 | Guo | G06V 30/18057 |
| 11,620,335 | B2* | 4/2023 | Kim | G06V 10/764 382/190 |
| 2005/0138674 | A1* | 6/2005 | Howard | H04N 21/8547 725/135 |
| 2005/0229227 | A1* | 10/2005 | Rogers | H04N 21/4725 725/115 |
| 2016/0323658 | A1* | 11/2016 | Richardson | G11B 27/28 |
| 2021/0286598 | A1* | 9/2021 | Luo | G06N 3/084 |

OTHER PUBLICATIONS

S. Ren, K. He, R. Girshick, and J. Sun, "Faster r-cnn: Towards real-time object detection with region proposal networks," in Advances in neural information processing systems, 2015, pp. 91-99.

W. Liu, D. Anguelov, D. Erhan, C. Szegedy, S. Reed, C.-Y. Fu, and A. C. Berg, "Ssd: Single shot multibox detector," in European conference on computer vision. Springer, 2016, pp. 21-37.

K. He, G. Gkioxari, P. Dollar, and R. Girshick, "Mask r-cnn," in Computer Vision (ICCV), 2017 IEEE International Conference on. IEEE, 2017, pp. 2980-2988.

W. Luo, J. Xing, A. Milan, X. Zhang, W. Liu, X. Zhao, and T.-K. Kim, "Multiple object tracking: A literature review," arXiv preprint arXiv:1409.7618, 2014.

Cao, Z., Simon, T., Wei, S.E., Sheikh, Y.: "Realtime multi-person 2d pose estimation using part affinity fields". In: CVPR (2017).

Chen, Y., Wang, Z., Peng, Y., Zhang, Z., Yu, G., Sun, J.: "Cascaded pyramid network for multi-person pose estimation". In: CVPR (2018).

Jeelani, I., Asadi, K., Ramshankar, H., Han, K., and Albert, A. 2021. "Real-time vision based worker localization & hazard detection for construction." Automation in Construction. 121(2021): 103448.

Li Xuelong et al; Video Synopsis in Complex Situations; IEEE Transactions on Image Processing; IEEE USA, vol. 27, No. 8, Aug. 1, 2018.

Yang Yoonsik et al; Scene Adaptive Online Surveillance Video Synopsis via Dynamic Tube Rearrangement Using Octree; IEEE Transactions on Image Processing, IEEE USA, vol. 30, Sep. 29, 2021.

Yunzuo Zhang et al, Object interaction-based surveillance video synopsis; Applied Intelligence, vol. 53, No. 4, Feb. 1, 2023.

Santos Daniel F. S. et al; Video Segmentation Learning Using Cascade Residual Convolutional Neural Network; 2013 32$^{nd}$ SIBGRAPI Conference on Graphics, Patterns and Images, IEEE, Oct. 28, 2019.

Qi Siyuan et al; Learning Human-Object Interactions by Graph Parsing Neural Networks, Oct. 5, 2018, SAT 2015 18$^{th}$ International Conference, Austin, Texas, USA.

* cited by examiner

METHOD AND SYSTEM FOR PRODUCING INTERACTION-AWARE VIDEO SYNOPSIS

CROSS REFERENCE TO RELATED APPLICATION

This Application claims priority from U.S. Provisional Patent Application No. 63/497,773 filed Apr. 24, 2023, which is incorporated herein by reference in its entirety,

FIELD OF THE INVENTION

The present invention relates generally to the field of video processing and, more particularly, to producing a variant of video synopsis.

BACKGROUND OF THE INVENTION

Prior to setting for the background of the invention it would be useful to provide some definition which shall be used hereinafter.

The term "video synopsis" as used herein is the name given to the technology which aims to minimize hours of video footage to a few minutes. The technology does so by tracking and analyzing moving objects (called events) and converting the incoming video streams into a database of events and activities. The information is then presented as a time-compressed video with links, for each event, to the actual video stream. The process begins by detecting and tracking objects of interest. Each object is represented as a "tube" in the "space-time" of the video stream (a sequence of video frames). Objects are detected and stored in a database in near-real time. Following a user request to summarize a time period, all objects from the desired time are extracted from the database and are shifted in time to create a much shorter summary video containing maximum activity (tube-packing).

The term video content analysis or video content analytics (VCA), also known as video analysis or video analytics (VA), as used herein, is the capability of automatically analyzing video to detect and determine temporal and spatial events. This technical capability is used in a wide range of domains including entertainment, video retrieval and video browsing, health-care, retail, automotive, transport, home automation, flame and smoke detection, safety, and security. The algorithms can be implemented as software on general-purpose machines, or as hardware in specialized video processing units.

Video Synopsis provides an efficient video summary. This is done by segmenting the moving objects in the video, and changing the appearance time of each object such that the duration of the newly created synopsis video is reduced. Some information can be lost in this process, such as the interactions between objects. Interactions may be lost as in video synopsis each object is treated separately. Given two interacting objects in the original video—each will likely be assigned a new appearance time in the synopsis video, and the interaction will not be visible.

In addition, some of the interactions visible in the synopsis video may be generated by objects from different original times that are just shifted to play simultaneously, creating new interactions that were not included in the original video.

SUMMARY OF THE INVENTION

The present invention, in embodiments thereof, addresses the aforementioned drawbacks of the so-called classic video synopsis. The inventors offer herein a way to render an interaction-aware synopsis. It is similar to the original synopsis with two important changes: First it has the option to keep the original relative time between interacting objects also in the synopsis video. Second, it has the option to visually distinguish in the generated synopsis video between real interactions which occurred in the original video to interactions that were created as a side effect of the video synopsis process.

In accordance with some embodiments of the present invention, a method of generating an interaction-aware video synopsis is provided herein. The method may include the following stages: obtaining, using a computer processor, a source video containing a plurality of source objects; extracting, using the computer processor, the source objects from the source video; detecting, using the computer processor, at least one object-interaction between at least two source objects; generating, using the computer processor, synopsis objects by sampling respective source objects; and generating, using the computer processor, a synopsis video having an overall play time shorter than the overall play time, of the source video, by determining a play time for each one of the synopsis objects, wherein at least two synopsis objects which are played at least partially simultaneously in the synopsis video, are generated from source objects that are captured at different times in the source video, and wherein a relative display time in the synopsis video of the at least two synopsis objects created from the at least two source objects, detected as having an object-interaction therebetween, is the same as the relative display time of the at least two source objects in the source video.

In accordance with some embodiments of the present invention, a system for generating an interaction-aware video synopsis, the system comprising: a server comprising: a processing device; a memory device; and an interface for communicating with a video camera, wherein the memory device comprising a set of instructions that, when executed, cause at the processing device to: obtain from the video camera a source video containing a plurality of source objects; extract the source objects from the source video; detect at least one object-interaction between at least two source objects; generate synopsis objects by sampling respective source objects; and generate a synopsis video having an overall play time shorter than the overall play time of the source video, by determining a play time for each one of the synopsis objects, wherein at least two synopsis objects which are played at least partially simultaneously in the synopsis video, are generated from source objects that are captured at different times in the source video, and wherein a relative display time in the synopsis video of the at least two synopsis objects created from the at least two source objects, detected as having an object-interaction therebetween, is the same as the relative display time of the at least two source objects in the source video.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
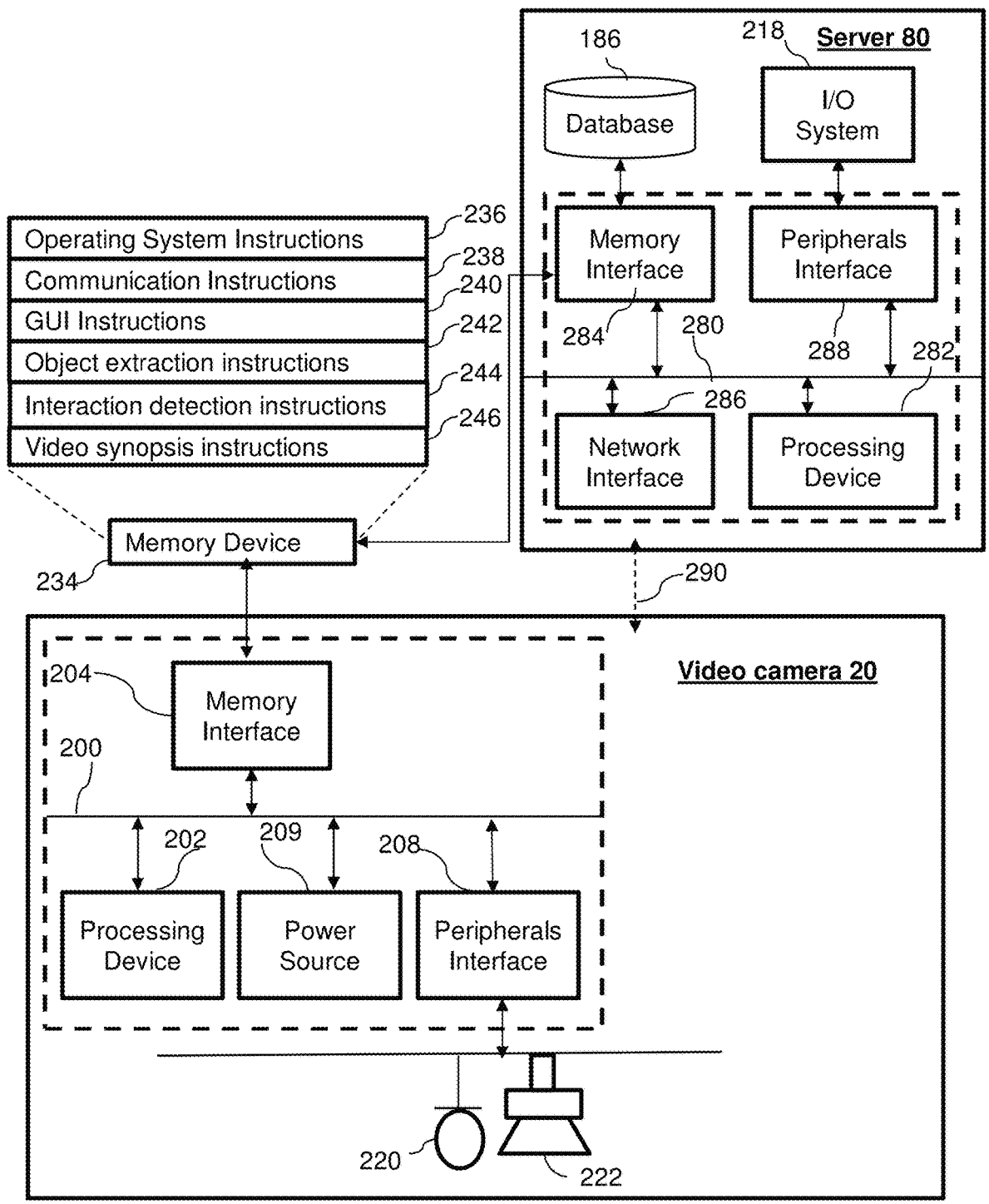
FIG. 1 is a block diagram illustrating an architecture of a system accordance with some embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In accordance with some embodiments of the present invention, the process of producing an interaction aware video synopsis may involve the following stages:

Object Extraction

The task of rendering an interaction-aware video synopsis can use a preliminary stage in which objects are detected and tracked in the original video. In some embodiments the scene background model may be learned and moving objects re-extracted by their difference from the background model. Such background subtraction methods are applicable as long as the recording camera is static.

Other object detection methods, such as Faster-RCNN or SSD, can be applied over the input video frames, providing bounding box locations of the objects in the scene. In addition, pose detection methods such as PifPaf, or CPN can be applied to extract pose information from objects. Such methods can work also when the camera is moving, as in the case of handheld cameras, vehicle mounted cameras, or wearable cameras. Pixel level object masks can be computed using instance segmentation methods such as Mask-RCNN. These methods are applicable also for video frames recorded by a moving camera. Multiple object tracking methods exist, associating objects between multiple frames of a video, such as reviewed in. These methods can connect the detections of each individual object in different video frames, based on appearance and motion similarity.

All previously described methods enable the computation of trajectories of objects in the scene. Each trajectory can be composed from detections of an object in a sequence of frames. At each frame the object can be designated by some point on the object (e.g. UTS center), or by a bounding box of the object, or by a pixel map forming a mask having the shape of the object in this frame.

Any of the existing methods for background subtraction, moving object segmentation, and objects tracking, known by people skilled in the art, is possible. The result of applying these methods give rise to object trajectories sometimes called "tubes", each tube representing a single object with a sequence of image locations of this object in successive video frames.

Detecting Object Interactions

Detecting object interactions is a broad term used for many different computer vision tasks. Possible, non-inclusive, examples of interaction are described below:

1. Objects staying near each other for a given minimum time and distance.
2. One object handing over some article to another object.
3. Objects touching each other, for example a handshake, and the like.
4. Person-vehicle interactions: A person riding a vehicle, entering, or exiting a vehicle.
5. People looking at each other, or even just one person looking at another person.
6. Performing joint activity—dancing, fighting, talking, laughing, jogging, and the like.
7. Vehicles in a convoy.

As mentioned above, this list is not inclusive, and there may be other interactions between objects not listed above.

Rendering a Synopsis Video Constrained by Object Interactions

In rendering an interaction-aware video synopsis, instead of rendering a synopsis like in classic video synopsis in interaction-aware video synopsis the video product maintains the original temporal relations between interacting objects, as occurred in the original video, so that this interaction is maintained in the generated synopsis video.

In accordance with some embodiments of the present invention, one possibility to achieve this goal is to represent multiple interacting object tubes as if they are a single combined tube. In this way, whenever a new appearance time is determined for the combined tube, all interacting tubes in it will maintain their original relative time.

In accordance with some embodiments of the present invention, another way to achieve this effect is to mark interacting objects and constrain the video synopsis process to keep the relative time of iterating objects also in the generated video synopsis.

In accordance with some embodiments of the present invention, a tube is a collection of regions in frames. Initially, the frames are consecutive, and every object may appear in different tubes: assume a person is walking behind a tree—we have a tube until the person disappears, and another one after he reappears. Once we determine that the tube before the tree and the tube after the tree are the same person, we combine them into a single tube. This means that when we move the object by two seconds for the synopsis, all regions in the tube move the same. It happened to us that when people walked behind a fence we would detect the legs as one tube and the torso as another, and only later connected them to a single tube.

In accordance with some embodiments of the present invention, where object interaction is detected, it is possible to carry out two processes:

1. Merge the two tubes into a single tube, and from now on the tubes are inseparable; or
2. Keep the tubes separate while remembering that they interact.

While the first approach is the simplest, the second approach may yield better results. In more details, a possible method to achieve this goal is as follows:

Define an "combined tube" representing several interacting objects: combined tube is a sequence of locations of the interacting objects in successive video frames. Where the location information, similarly as in regular object tubes, could be by a set including the image points of all the interacting objects, or by a combined set of bounding boxes of the objects, or by a set of pixel maps forming a mask covering the shapes of the interacting objects in a frame. In the video synopsis process the "combined tube" will be treated as a "tube";

Given a set of object tubes and a metadata regarding their interactions which consists of the other tubes in the interactions and, go over all the tubes. For each tube, if it does not have an interaction, add it to a set S of tubes which will be rendered for the synopsis. If this tube does have an interaction, create from all the relevant tubes an interaction-tube, and add it to S. It is preferred not to add the original tubes of the interaction-tube to S, but it is an option; and Use the same rendering methods as in classic video synopsis to render a synopsis, but with S as input. Optionally, it is possible to mark objects which share an interaction in the synopsis. Such markings could be colored bounding boxes, arrows, or any other way to visually distinguish the real interaction of those objects from the overall density of objects in the synopsis.

Improvement Over Classic Video Synopsis and Older Variations Thereof

Improvement Over Relevance Sorted Video Synopsis

In relevance sorted video synopsis, a video synopsis is generated by sorting objects in respect to some selected features. Assume an object is pre-selected, a possible feature can include the interaction with the pre-selected object. So, the generated synopsis will show objects interacting with the pre-selected object. However, the synopsis video will most likely fail to show the interactions themselves, as each object is given an independent play time in the generated video synopsis, while showing the interactions requires keeping the original relative time between the objects.

The purpose of embodiments of the present invention is to specifically use interaction as one of the features for selecting objects in a synopsis. Other features for selection are possible as well, such as object classes, object activity, etc. Given a selected time period, sample selections can be, for example:

(1) Interactions between a person and a car in a given time period;
(2) Interactions involving an adult and a child;
(3) Interactions between people entering a building and people exiting the building; and
(4) Interactions between a specific person and other people in the scene.

In addition, interactions can be specified by identity of the objects involved, or by the exact type of activity. For example:

(1) Interactions between a specific person A and other people;
(2) A person exiting a red sports car;
(3) A person enters a four-wheeled vehicle;
(4) A street fight; and
(5) Person A enters a car.

As described before, all objects involved in selected interactions will be displayed in the resulting synopsis video. For each interaction, all objects in that interaction will be displayed at the synopsis video while keeping their relative display time the same as in the input video. This assures that each selected interaction will be visible at the synopsis video exactly as it occurred at the original video.

Improvement Over Synopsis from Multiple Sources

In video synopsis generated based on multiple sources a video synopsis is generated from an input of multiple cameras. A common background image is rendered, and a synopsis of objects from different cameras is rendered on that background image. Moreover, the term "source objects" is defined as physical objects that are imaged by the cameras, which then create "video objects" or more simply, "objects". All the objects of a "source object" which was viewed in multiple cameras, can be assigned with a unique id, and rendered accordingly. This process is known in the art of Computer Vision as Cross-Camera-Tracking. The synopsis can include pre-selected sets of objects, which are clustered by a common attribute or feature.

The scope of some embodiments of the present invention is to specifically use interaction as one of the features for selecting "source objects" in a synopsis.

Using Cross-Camera-Tracking and similarly to interactions can be used to select groups of "source objects". Other features for selection are possible as well, such as object classes, object activity, object unique description or ID, etc. Given a selected time period, sample selections can be, for example:

(1) Interactions between a person and a car in a given time period, in multiple cameras;
(2) Interactions involving an adult and a child, in multiple cameras;
(3) Interactions between people entering a building and people exiting the building, from multiple viewpoints;
(4) Interactions between a specific person and all the other people in multiple scenes.

Rendering an Interaction-Aware Synopsis from Multiple Sources

Interaction aware video synopsis can also be done in the case of video synopsis from multiple sources. Interactions between objects can be performed for objects appearing in the same video source (for example, same camera or same video clip). Once the desired interaction is detected as described in earlier sections, we could perform the multi-camera video synopsis while keeping the original temporal relations between interacting objects also in the resulting synopsis video.

While a description of how to find interactions between objects appearing in the same source video has been provided herein, under some circumstances, interactions can also be detected for objects appearing in different video sources. Under the assumption that the different video sources can be aligned temporally, an example of the detection of such interactions can be as follows: When the relative geometry of two cameras is known, the distance in the scene between two objects can be determined even when the two objects appear in different cameras. In this case of interactions involving scene proximity and temporal proximity—they can be computed even for objects appearing in different cameras.

In the remainder of the description, the architecture of a system in accordance with some embodiments of the present invention is provided in further detail. FIG. 1 shows a block diagram of the configuration of a video camera 20 and a server 80 configured to produce interaction-aware video synopsis based on video analytics. With regard to the video camera 20, and according to some embodiments, the video camera 20, directly or indirectly, may access a bus 200 (or another data transfer mechanism) that interconnects subsystems and components for transferring information within the video camera 20. For example, bus 200 may interconnect a processing device 202, a memory interface 204, and a peripherals interface 208 connected to an I/O system 210. Power source 209 provides the power to the video camera 20 and it may include a primary or a rechargeable battery (not shown), DC-DC converters (not shown) and other components required for the proper operation of the video camera 20.

In some embodiments, processing device 202 may use a memory interface 204 to access data and a software product stored on a memory device 234 or a non-transitory computer-readable medium device 234.

It should be noted that in some embodiments memory device 234 may be part of the server whereas in other embodiments memory device 234 may be part of video camera 20.

According to some embodiments, the peripherals interface 208 may also be connected to sensors, devices, and subsystems to facilitate multiple functionalities. In one embodiment, the peripherals interface 208 may be connected to an I/O system 210 configured to receive signals or input from devices and to provide signals or output to one or more devices that allow data to be received and/or transmitted by the video camera 20. In one example, the I/O system 210 may include a touch screen controller 212, audio controller 214, and/or other types of input controller(s) 216. The touch screen controller 212 may be coupled to a touch screen 218. The touch screen 218 and the touch screen controller 212 may, for example, detect contact, and movement, using any of a plurality of touch sensitivity technologies, including but not limited to capacitive, resistive, infrared, and surface acoustic wave technologies as well as other proximity sensor arrays or other elements for determining one or more points of contact with the touch screen 218. The touch screen 218 may also, for example, be used to implement virtual or soft buttons and/or a keyboard. While a touch screen 218 is shown in FIG. 1, I/O system 210 may include a display screen (e.g., LCD or LED) in place of a touch screen 218. According to some embodiments, the peripherals interface 208 may also be connected to an image sensor 226, a motion sensor 228, a light sensor 230, and/or a proximity sensor 232 to facilitate image capturing, orientation, lighting, and proximity functions. In addition, a GPS receiver may also be integrated with, or connected to, the video camera 20, such as GPS receivers typically integrated into mobile communications devices. Alternatively, GPS software may permit the video camera 20 to access an external GPS receiver (e.g., connecting via a serial port or Bluetooth).

Consistent with the present disclosure, video camera 20 may use a memory interface 204 to access a memory device 234. The memory device 234 may store an operating system 236, such as Android, iOS, MS Windows, Linux, or any other embedded operating system. Operating system 236 may include instructions for handling basic system services and for performing hardware-dependent tasks. In some implementations, the operating system 236 may be a kernel (e.g., Linux kernel).

The memory device 234 may also store communication instructions 238 to facilitate communicating with one or more additional devices, one or more computers, and/or one or more servers. The memory device 234 may include: graphical user interface instructions 240 to facilitate graphic user interface processing; object extraction instructions 242 to facilitate object extraction from the source video and functions; interaction detection instructions 244 to facilitate detection of interaction between objects in the source video and functions; and video synopsis instructions 246 to facilitate generating of interaction-aware video synopsis and functions.

Each of the above-identified instructions and applications may correspond to a set of instructions for performing one or more functions described above. These instructions do not necessarily need to be implemented as separate software programs, procedures, or modules. The memory device 234 may include additional instructions or fewer instructions. Furthermore, various functions of the video camera 20 may be implemented in hardware and/or software, including in one or more signal processing and/or application-specific integrated circuits.

Still referring to FIG. 1, and according to some embodiments of the present invention, a server 80 for production on interaction-aware video synopsis of a video captured by at least one video camera 20.

Processing device 282 may include at least one processor configured to execute computer programs, applications, methods, processes, or other software to perform embodiments described in the present disclosure.

In some embodiments, processing device 282 may use a memory interface 284 to access data and a software product stored on a memory device or a non-transitory computer-readable medium or to access a data structure 186.

In accordance with embodiments of the present invention memory device 234 may include a set of instructions that, when executed, cause at the processing device 282 to: obtain from the video camera 20 a source video containing a plurality of source objects; extract the source objects from the source video; detect at least one object-interaction between at least two source objects; generate synopsis objects by sampling respective source objects; and generate a synopsis video having an overall play time shorter than the overall play time of the source video, by determining a play time for each one of the synopsis objects, wherein at least two synopsis objects which are played at least partially simultaneously in the synopsis video, are generated from source objects that are captured at different times in the source video, and wherein a relative display time in the synopsis video of the at least two synopsis objects created from the at least two source objects, detected as having an object-interaction therebetween, is the same as the relative display time of the at least two source objects in the source video.

According to some embodiments, the extracting of the source objects from the source video is carried out by training a machine learning model to distinguish between foreground objects and a background object.

According to some embodiments, the detection of the at least one object-interaction between at least two source objects is carried out by training a machine learning model to detect object interaction.

According to some embodiments, each one of the source objects is represented by a respective tube and wherein the memory device 234 further comprising a set of instructions that, when executed, cause the processing device 282 to merge the respective tubes for the at least two source objects, detected as having an object-interaction therebetween into a single tube.

According to some embodiments, the memory device 234 further comprising a set of instructions that, when executed, cause the processing device 282 to use the single tube to guarantee that the relative display time in the synopsis video of the at least two synopsis objects created from the at least two source objects, detected as having an object-interaction therebetween is the same as the relative display time of the at least two source objects in the source video.

According to some embodiments, each one of the source objects is represented by a respective tube and wherein the memory device 234 further comprising a set of instructions that, when executed, cause the processing device 282 to tag the respective tubes with a tag for the at least two source objects, detected as having an object-interaction therebetween, as associated with a same object interaction.

According to some embodiments, the memory device 234 further comprising a set of instructions that, when executed, cause the processing device 282 to use the tag to guarantee that the relative display time in the synopsis video of the at least two synopsis objects created from the at least two source objects, detected as having an object-interaction therebetween is the same as the relative display time of the at least two source objects in the source video.

According to some embodiments, the network interface 286 may provide two-way data communication to a network. In FIG. 1, communication 290 between the video camera 20 and server 80 is represented by a dashed arrow. In one embodiment, the network interface 286 may include an integrated services digital network (ISDN) card, cellular modem, satellite modem, or a modem to provide a data communication connection over the Internet. As another example, the network interface 286 may include a wireless local area network (WLAN) card. In another embodiment, the network interface 286 may include an Ethernet port connected to radio frequency receivers and transmitters. The specific design and implementation of the network interface 286 may depend on the communications network(s) over which the video camera 20 and the server 80 may communicate.

According to some embodiments, the server 80 may also include a peripherals interface 288 coupled to the bus 280. The peripherals interface 288 may also be connected to devices, and subsystems to facilitate multiple functionalities as performed by the server 80. In some embodiments, those devices and subsystems may comprise a display screen (e.g., CRT or LCD) a USB port, and the like.

The components and arrangements shown in FIG. 1 for both server 80 and the video camera 20 are not intended to limit the disclosed embodiments. As will be appreciated by a person skilled in the art having the benefit of this disclosure, numerous variations and/or modifications may be made to the depicted configuration of server 80 and the video camera 20. For example, not all the depicted components may be essential for the operation of server 80 or the video camera 20 in all cases. Any component may be located in any appropriate part of server 80, and the components may be rearranged into a variety of configurations while providing the functionality of the disclosed embodiments. For example, some types of video cameras 20 may include only part of the depicted sensors and include sensors which are not depicted.

Figure 2:
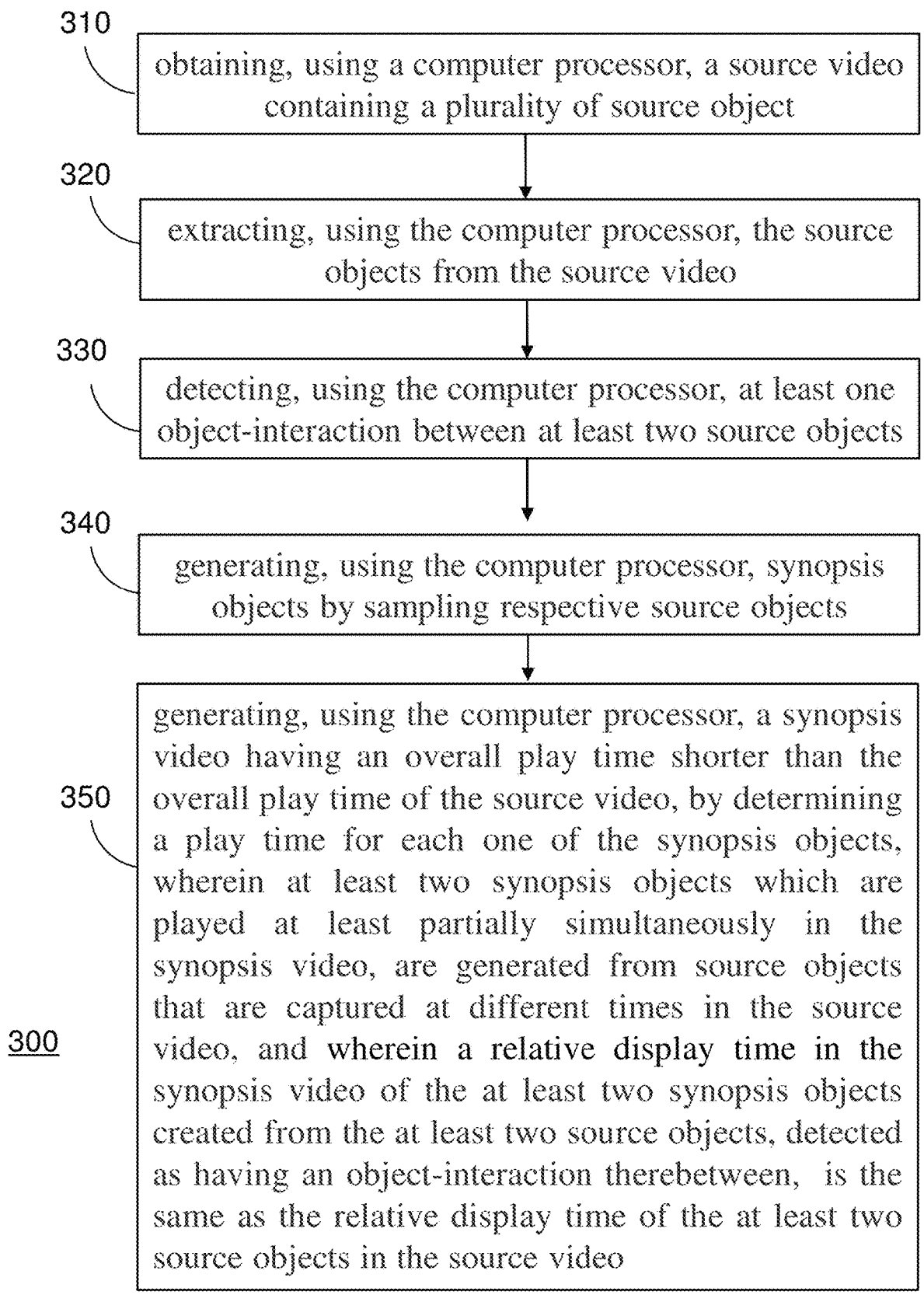
FIG. 2 is a high-level flowchart illustrating a method in accordance with some embodiments of the present invention.

FIG. 2 is a high-level flowchart illustrating a method in accordance with some embodiments of the present invention. Method 300 of generating an interaction-aware video synopsis, is provided herein and may include the following steps: obtaining, using a computer processor, a source video containing a plurality of source objects 310; extracting, using the computer processor, the source objects from the source video 320; detecting, using the computer processor, at least one object-interaction between at least two source objects 330; generating, using the computer processor, synopsis objects by sampling respective source objects 340; and generating, using the computer processor, a synopsis video having an overall play time shorter than the overall play time of the source video, by determining a play time for each one of the synopsis objects 350, wherein at least two synopsis objects which are played at least partially simultaneously in the synopsis video, are generated from source objects that are captured at different times in the source video, and wherein a relative display time in the synopsis video of the at least two synopsis objects created from the at least two source objects, detected as having an object-interaction therebetween, is the same as the relative display time of the at least two source objects in the source video.

According to some embodiments of the present invention, in method 300, each one of the source objects may represented by a respective tube and method 300 may further include a step of merging the respective tubes for the at least two source objects, detected as having an object-interaction therebetween into a single tube.

According to some embodiments of the present invention, method 300, may further include a step of using the single tube to guarantee that the relative display time in the synopsis video of the at least two synopsis objects created from the at least two source objects, detected as having an object-interaction therebetween is the same as the relative display time of the at least two source objects in the source video.

According to some embodiments of the present invention, in method 300, each one of the source objects may represented by a respective tube and method 300 may further include a step of tagging the respective tubes for the at least two source objects, detected as having an object-interaction therebetween, as associated with a same object interaction.

According to some embodiments of the present invention, method 300 may further include the step of using the tagging to guarantee that the relative display time in the synopsis video of the at least two synopsis objects created from the at least two source objects, detected as having an object-interaction therebetween is the same as the relative display time of the at least two source objects in the source video.

Some embodiments of the invention may be carried out by a computing system. For example, a processor, operatively connected to a memory holding data and software, code, or instructions, may be configured or programmed by the software, code or instructions to carry out embodiments of the present invention. More than one such processor or computing system may be used.

It should be noted that all methods according to some embodiments of the present invention may be stored as instructions in a computer readable medium to cause processors, such as central processing units (CPU) to perform the method. Additionally, the method described in the present disclosure can be stored as instructions in a non-transitory computer readable medium, such as storage devices which may include hard disk drives, solid state drives, flash memories, and the like. Additionally, non-transitory computer readable medium can be memory units.

In order to implement the method according to some embodiments of the present invention, a computer processor may receive instructions and data from a read-only memory or a random-access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, JavaScript Object Notation (JSON), C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment", "an embodiment", or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that, where the claims or specification refer to "a" or "an" element, such reference is not be construed that there is only one of that element.

It is to be understood that, where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of generating an interaction-aware video synopsis, the method comprising:
    obtaining, using a computer processor, a source video containing a plurality of source objects;
    extracting, using the computer processor, the source objects from the source video;
    detecting, using the computer processor, at least one object-interaction between at least two source objects, wherein said object interaction comprises an interaction between the at least two objects in the scene which is visible in the source video;
    generating, using the computer processor, synopsis objects by sampling respective source objects; and
    generating, using the computer processor, a synopsis video having an overall play time shorter than the overall play time of the source video, by determining a play time for each one of the synopsis objects,
    wherein at least two synopsis objects which are played at least partially simultaneously in the synopsis video, are generated from source objects that are captured at different times in the source video, and
    maintaining a relative display time in the synopsis video of at least two of the synopsis objects created from the at least two source objects, responsive to the detecting of the at least one object-interaction between the at least two source objects, so the relative display time is the same as the relative display time of the at least two source objects in the source video,
    wherein the maintaining of the relative display time in the synopsis video of the at least one object-interaction between the at least two source objects is achieved by either:
    a) representing multiple interacting object tubes as if they are a single combined tube, and whenever a new appearance time is determined for the single combined tube, all interacting tubes therein maintain an original relative time; or
    b) marking interacting objects and constraining the generating of the video synopsis, by keeping the relative time of iterating objects also in the generated video synopsis.

2. The method according to claim 1, wherein the extracting of the source objects from the source video is carried out by training a machine learning model to distinguish between foreground objects and a background object.

3. The method according to claim 1, wherein the detection of the at least one object-interaction between at least two source objects is carried out by training a machine learning model to detect object interaction.

4. The method according to claim 1, wherein each one of the source objects is represented by a respective tube and wherein the method further comprising merging the respective tubes for the at least two source objects, detected as having an object-interaction therebetween into a single tube.

5. The method according to claim 4, further comprising using the single tube to guarantee that the relative display time in the synopsis video of the at least two synopsis objects created from the at least two source objects, detected as having an object-interaction therebetween is the same as the relative display time of the at least two source objects in the source video.

6. The method according to claim 1, wherein each one of the source objects is represented by a respective tube and wherein the method further comprising tagging the respective tubes for the at least two source objects, detected as having an object-interaction therebetween, as associated with a same object interaction.

7. The method according to claim 6, further comprising using the tagging to guarantee that the relative display time in the synopsis video of the at least two synopsis objects created from the at least two source objects, detected as having an object-interaction therebetween is the same as the relative display time of the at least two source objects in the source video.

8. A non-transitory computer readable medium for generating an interaction-aware video synopsis, the computer readable medium comprising a set of instructions that, when executed, cause at least one computer processor to:
   obtain a source video containing a plurality of source objects;
   extract the source objects from the source video;
   detect at least one object-interaction between at least two source objects wherein said object interaction comprises an interaction between the at least two objects in the scene which is visible in the source video;
   generate synopsis objects by sampling respective source objects; and
   generate a synopsis video having an overall play time shorter than the overall play time of the source video, by determining a play time for each one of the synopsis objects,
   wherein at least two synopsis objects which are played at least partially simultaneously in the synopsis video, are generated from source objects that are captured at different times in the source video, and
   maintain a relative display time in the synopsis video of at least two of the synopsis objects created from the at least two source objects, responsive to the detecting of the at least one object-interaction between the at least two source objects, so the relative display time is the same as the relative display time of the at least two source objects in the source video,
   wherein the maintaining of the relative display time in the synopsis video of the at least one object-interaction between the at least two source objects is achieved by either:
   a) representing multiple interacting object tubes as if they are a single combined tube, and whenever a new appearance time is determined for the single combined tube, all interacting tubes therein maintain an original relative time; or
   b) marking interacting objects and constraining the generating of the video synopsis, by keeping the relative time of iterating objects also in the generated video synopsis.

9. The non-transitory computer readable medium according to claim 8, wherein the extracting of the source objects from the source video is carried out by training a machine learning model to distinguish between foreground objects and a background object.

10. The non-transitory computer readable medium according to claim 8, wherein the detection of the at least one object-interaction between at least two source objects is carried out by training a machine learning model to detect object interaction.

11. The non-transitory computer readable medium according to claim 8, wherein each one of the source objects is represented by a respective tube and wherein the computer readable medium further comprising a set of instructions that, when executed, cause the at least one computer processor to merge the respective tubes for the at least two source objects, detected as having an object-interaction therebetween into a single tube.

12. The non-transitory computer readable medium according to claim 11, and wherein the computer readable medium further comprising a set of instructions that, when executed, cause the at least one computer processor to use the single tube to guarantee that the relative display time in the synopsis video of the at least two synopsis objects created from the at least two source objects, detected as having an object-interaction therebetween is the same as the relative display time of the at least two source objects in the source video.

13. The non-transitory computer readable medium according to claim 8, wherein each one of the source objects is represented by a respective tube and wherein the computer readable medium further comprising a set of instructions that, when executed, cause the at least one computer processor to tag the respective tubes with a tag for the at least two source objects, detected as having an object-interaction therebetween, as associated with a same object interaction.

14. The non-transitory computer readable medium according to claim 13, and wherein the computer readable medium further comprising a set of instructions that, when executed, cause the at least one computer processor to use the tag to guarantee that the relative display time in the synopsis video of the at least two synopsis objects created from the at least two source objects, detected as having an object-interaction therebetween is the same as the relative display time of the at least two source objects in the source video.

15. A system for generating an interaction-aware video synopsis, the system comprising:
   a server comprising:
   a processing device;
   a memory device; and
   an interface for communicating with a video camera,
   wherein the memory device comprising a set of instructions that, when executed, cause at the processing device to:
   obtain from the video camera a source video containing a plurality of source objects;
   extract the source objects from the source video;
   detect at least one object-interaction between at least two source objects, wherein said object interaction comprises an interaction between the at least two objects in the scene which is visible in the source video;
   generate synopsis objects by sampling respective source objects; and
   generate a synopsis video having an overall play time shorter than the overall play time of the source video, by determining a play time for each one of the synopsis objects,
   wherein at least two synopsis objects which are played at least partially simultaneously in the synopsis video, are generated from source objects that are captured at different times in the source video, and
   maintain a relative display time in the synopsis video of at least two of the synopsis objects created from the at least two source objects, responsive to the detecting of the at least one object-interaction between the at least two source objects, so the relative display time is the same as the relative display time of the at least two source objects in the source video, wherein the maintaining of the relative display time in the synopsis video of the at least one object-interaction between the at least two source objects is achieved by either:
a) representing multiple interacting object tubes as if they are a single combined tube, and whenever a new appearance time is determined for the single combined tube, all interacting tubes therein maintain an original relative time; or
b) marking interacting objects and constraining the generating of the video synopsis, by keeping the relative time of iterating objects also in the generated video synopsis.

16. The system according to claim 15, wherein the extracting of the source objects from the source video is carried out by training a machine learning model to distinguish between foreground objects and a background object.

17. The system according to claim 15, wherein the detection of the at least one object-interaction between at least two source objects is carried out by training a machine learning model to detect object interaction.

18. The system according to claim 15, wherein each one of the source objects is represented by a respective tube and wherein the memory device further comprising a set of instructions that, when executed, cause the processing device to merge the respective tubes for the at least two source objects, detected as having an object-interaction therebetween into a single tube.

19. The system according to claim 18, and wherein the memory device further comprising a set of instructions that, when executed, cause the processing device to use the single tube to guarantee that the relative display time in the synopsis video of the at least two synopsis objects created from the at least two source objects, detected as having an object-interaction therebetween is the same as the relative display time of the at least two source objects in the source video.

20. The system according to claim 15, wherein each one of the source objects is represented by a respective tube and wherein the memory device further comprising a set of instructions that, when executed, cause the processing device to tag the respective tubes with a tag for the at least two source objects, detected as having an object-interaction therebetween, as associated with a same object interaction.

21. The system according to claim 20, and wherein the memory device further comprising a set of instructions that, when executed, cause the processing device to use the tag to guarantee that the relative display time in the synopsis video of the at least two synopsis objects created from the at least two source objects, detected as having an object-interaction therebetween is the same as the relative display time of the at least two source objects in the source video.

* * * * *